US012063102B2

United States Patent
Ooshima et al.

(10) Patent No.: US 12,063,102 B2
(45) Date of Patent: Aug. 13, 2024

(54) BROADCAST SIGNAL DETECTING METHOD AND BROADCAST SIGNAL DETECTING DEVICE

(71) Applicant: Faurecia Clarion Electronics Co., Ltd., Saitama (JP)

(72) Inventors: Hideki Ooshima, Saitama (JP); Hiroshi Matsuda, Saitama (JP); Takeshi Kunii, Saitama (JP); Akihiko Takada, Saitama (JP); Yuujirou Matsukura, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 344 days.

(21) Appl. No.: 17/708,242

(22) Filed: Mar. 30, 2022

(65) Prior Publication Data

US 2022/0321243 A1 Oct. 6, 2022

(30) Foreign Application Priority Data

Apr. 6, 2021 (JP) .................. 2021-064730

(51) Int. Cl.
*H04B 1/18* (2006.01)
*H04H 20/12* (2008.01)
*H04H 20/42* (2008.01)

(52) U.S. Cl.
CPC .......... *H04H 20/12* (2013.01); *H04H 20/426* (2013.01)

(58) Field of Classification Search
CPC ...... H04H 20/12; H04H 20/426; H04H 20/44; H04H 40/18; H04H 60/15; H04H 60/29; H04H 60/44; H04H 60/54; H04H 2201/10
See application file for complete search history.

(56) References Cited

U.S. PATENT DOCUMENTS

| 2004/0235440 A1 | 11/2004 | Toporski et al. |
| 2008/0298440 A1 | 12/2008 | Kroeger et al. |
| 2010/0098195 A1* | 4/2010 | Nekhamkin ........ H04L 27/0014 375/344 |

(Continued)

FOREIGN PATENT DOCUMENTS

| JP | 2005-5848 A | 1/2005 |
| JP | 2007-259403 A | 10/2007 |
| JP | 2013-207766 A | 10/2013 |

*Primary Examiner* — Tuan Pham
(74) *Attorney, Agent, or Firm* — IP Business Solutions, LLC

(57) ABSTRACT

If reception quality of a broadcast signal of a first frequency received by a tuner satisfies setting conditions, the frequency received by the tuner is changed from the first frequency to a second frequency. It is evaluated whether or not the amount of offset between a reference frequency and the frequency of the signal, which is generated by converting the broadcast signal of the second frequency received by the tuner into an intermediate frequency is within a predetermined range. If the offset between the reference frequency and the frequency of the intermediate frequency signal is within the predetermined range, the data included in the broadcast signal of the first frequency is acquired by a demodulating the broadcast signal of the first frequency. It is evaluated whether or not the broadcast signal of the first frequency is a broadcast signal of a broadcasting station based on the acquired data.

8 Claims, 4 Drawing Sheets

(56) References Cited

U.S. PATENT DOCUMENTS

| | | | |
|---|---|---|---|
| 2010/0203855 A1* | 8/2010 | Komiyama | H04H 40/18 455/150.1 |
| 2010/0210228 A1 | 8/2010 | Ishida et al. | |
| 2011/0244822 A1* | 10/2011 | Takeuchi | H04B 7/08 455/307 |

* cited by examiner

BROADCAST SIGNAL DETECTING METHOD AND BROADCAST SIGNAL DETECTING DEVICE

INCORPORATION BY REFERENCE

The present application claims priority under 35 U.S.C. § 119 to Japanese Patent Application No. 2021-064730 filed on Apr. 6, 2021. The content of the application is incorporated herein by reference in its entirety.

FIELD OF TECHNOLOGY

The present invention relates to a broadcast signal detecting method and broadcast signal detecting device.

PRIOR ART

In digital radio broadcasting that uses an IBOC ("In-Band On Channel") system there are a hybrid system and an all-digital system as broadcast signal transmission systems.

In the hybrid system, a digital signal is added to an analog radio signal to enable reception of a broadcast with the same content both by a radio receiver of a conventional analog system and an HD radio receiver that is compatible with digital reception to listen the content with a digital broadcast. The all-digital system is a system where digital signals are located in all frequency bands including the bands that had been occupied exclusively by analog radio signals, which is expected to be used instead of the hybrid system.

Patent Document 1 discloses an IBOC broadcast receiver comprising: broadcast selecting means for selectively outputting a broadcast signal that is tuned to a frequency from among various broadcast signals received through an antenna; received electric field strength detecting means for detecting the electric field strength and a received frequency that corresponds to the frequency that was set when a station was found; and controlling means that are operably connected to the broadcast selecting means and received electric field strength detecting means, wherein: the controlling means selectively output the broadcast signal upon evaluation that an IBOC broadcast signal or an analog broadcast signal is included in the signal of the received frequency, based on a result detected by the received electric field strength detecting means while the broadcast selecting means is finding stations by moving its received frequency step by step at intervals of a prescribed step unit.

PRIOR ART REFERENCES

Patent Documents

[Patent Document 1] Japanese Unexamined Patent Application Publication 2005-5848

SUMMARY OF THE INVENTION

[Problem Solved by the Present Invention]

However, because any analog broadcast is not included in the all-digital system, there is a problem in that the search for the broadcast signals of broadcasting stations is time-consuming when a searching method is used wherein the broadcast signal is selected and outputted upon evaluation that an analog broadcast signal is included, as it is in Patent Document 1.

The object of the present invention was created in contemplation of the above, and the object thereof is to provide a broadcast signal detecting method and broadcast signal detecting device able to shorten the time required for searching for a broadcast signal of an all-digital system.

Means for Solving the Problem

In order to achieve the object set forth above, the broadcast signal detecting method according to the present invention is a broadcast signal detecting method for detecting a broadcast signal of a radio broadcast of an all-digital system, including: a receiving step for receiving a broadcast signal of a first frequency; a first evaluating step for evaluating whether or not reception quality of the broadcast signal of the first frequency, received through the receiving step, satisfies setting conditions; a changing step for changing the frequency to be received by the receiving step to a second frequency that is within a range, that has been set in advance, from the first frequency, upon an evaluation in the first evaluating step that the reception quality of the broadcast signal of the first frequency satisfies the setting conditions; a converting step for converting, to a signal of an intermediate frequency, the broadcast signal of the second frequency that has been received in the receiving step; a second evaluating step for evaluating whether or not the frequency offset, which is the amount of offset between a reference frequency and the frequency of the converted signal of the intermediate frequency, is within a range that has been set in advance; an acquiring step for performing a demodulating process on the broadcast signal of the first frequency to acquire data included in the broadcast signal of the first frequency, if the evaluation in the second evaluating step is that the frequency offset is within the range that has been set in advance; and a third evaluating step for evaluating whether or not data that has been set in advance is included in the acquired data, to evaluate whether or not the broadcast signal of the first frequency is a broadcast signal of a broadcasting station.

Effects of the Invention

The present invention enables shortening of the time required for searching for a broadcast signal of an all-digital system.

BRIEF DESCRIPTIONS OF THE DRAWING PORTIONS

FORMS FOR CARRYING OUT THE PRESENT INVENTION

In the below an embodiment according the present invention will be explained in reference to the appended drawings.

Figure 1:
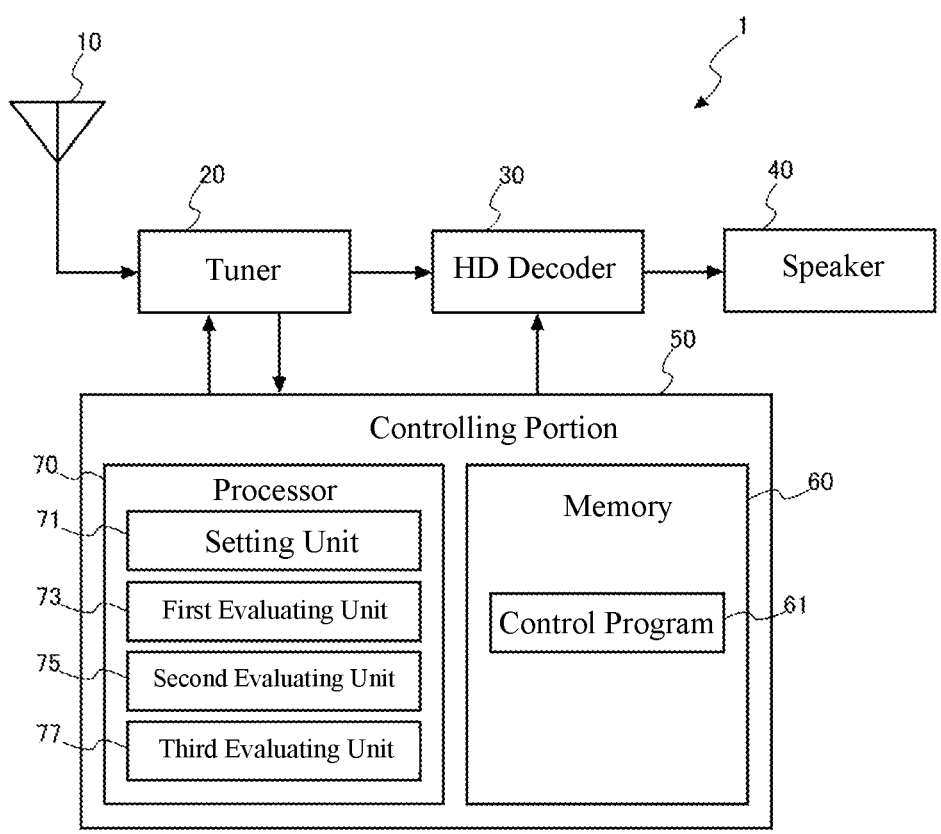
FIG. 1 is a block diagram showing schematically the structure of a broadcast signal detecting device.

FIG. 1 is a block diagram showing schematically a structure for a broadcast signal detecting device 1.

The broadcast signal detecting device 1 is, for example, mounted in a vehicle as a vehicle audio device. The broadcast signal detecting device 1 comprises an antenna 10, a tuner 20, an HD decoder 30, a speaker 40, and a controlling unit 50.

The antenna 10 receives a broadcast signal of a digital radio broadcast.

The tuner 20 corresponds to the receiving unit. The tuner 20, following control by the controlling unit 50, carries out frequency tuning in respect to a broadcast signal received by the antenna 10. The tuner 20 comprises a well-known high frequency (RF) amplifier, a mixer, a local oscillator, an intermediate frequency (IF) filter, and the like. Drawings of the RF amplifier, the mixer, the local oscillator, and the IF filter are omitted. In the tuner 20, after the broadcast signal that has been received from the antenna 10 has been amplified by the RF amplifier, it is then mixed, in the mixer, with a local oscillator signal from the local oscillator that is controlled by the controlling unit 50, to convert into an intermediate signal, which then passes through an IF filter, to be outputted to the HD decoder 30.

Moreover, the tuner 20 generates reception quality information based on the broadcast signal received by the antenna 10, and outputs the generated reception quality information to the controlling unit 50. The reception quality information includes the electric field level of the broadcast signal, an FOF (Frequency Offset) value, and a S/N ratio.

The FOF value indicates the amount of offset from a reference frequency of the intermediate frequency signal generated through mixing with the local oscillator signal. While the present embodiment will explain an example wherein the reference frequency is 0 Hz, the reference frequency may not be 0 Hz.

The HD decoder 30 corresponds to the demodulating unit. The HD decoder 30 detects the intermediate frequency signal inputted from the tuner 20, and demodulates the intermediate frequency signal into analog stereo audio signals (respective audio signals for left and right channels) by a multiplexer, and amplifies the analog stereo audio signals by an amplifier. The HD decoder 30 outputs the audio signals amplified by the amplifier to speakers 40. The multiplexer and amplifier are omitted from the drawings.

Additionally, the HD decoder 30 is equipped with the six audio codecs listed below:
(1): FM hybrid single-stream on P1 channel
(2): FM all-digital dual-stream with mono core (typically used with MP5)
(3): AM hybrid/all-digital dual-stream
(4): FM all-digital dual-stream with stereo core (typically used with MP6)
(5): FM dual-stream on SPS
(6) FM hybrid/all-digital single-stream on P3 channel Upon reception of a digital radio broadcast of the AM all-digital type, the HD decoder 30 carries out the decoding process using the AM hybrid/all-digital dual stream.

The speakers 40 are provided in a plurality of locations within the passenger compartment, such as, for example, in the left and right doors of the front seat, the left and right doors of the backseat or the like. While, for convenience, in FIG. 1 a speaker 40 is shown as a single functional block, the number of installed speakers 40 is not limited to one, but rather, a plurality of speakers may be installed as needed.

The controlling unit 50 is a computer device comprising a memory 60 and a processor 70.

The memory 60 is structured from a RAM (Random Access Memory) and a ROM (Read Only Memory). The RAM is used for temporary storage of various types of data, and the like, where the ROM stores a control program 61 for controlling the operations of the broadcast signal detecting device 1, along with various types of setting information, and the like.

The processor 70 is an arithmetic processing unit structured from a CPU (Central Processing Unit) or MPU (Micro Processing Unit). The processor 70 executes a control program 61 to control the various units of the broadcast signal detecting device 1.

The controlling unit 50 comprises, as functional blocks, a setting unit 71, a first evaluating unit 73, a second evaluating unit 75, and a third evaluating unit 77. These functional blocks conveniently show the functions achieved through the processor 70 by executing arithmetic processes according to the control program 61 by blocks.

The setting unit 71 corresponds to the changing unit. The setting unit 71 sets the tuning frequency of the tuner 20. The setting unit 71 executes a seek operation for searching for broadcast channels able to receive a broadcast signal from a broadcasting station by sequentially setting the tuning frequencies of the tuner 20 at predetermined frequency intervals. Here the frequency that the setting unit 71 sets to the tuner 20 shall be termed the "first frequency."

Additionally, if the reception quality of the broadcast signal received by the tuner 20 satisfies first conditions, described below, the setting unit 71 changes the tuning frequency of the tuner 20 from the first frequency to a second frequency.

The second frequency is a frequency shifted within a predetermined range from the first frequency, and the predetermined range is between 4906 Hz and 9448 Hz, which is determined by the IBOS standard.

In the present embodiment, a frequency where 8 kHz is added to the first frequency is set as the second frequency. Otherwise, a frequency wherein 8 kHz is subtracted from the first frequency may be set as the second frequency.

The first evaluating unit 73 evaluates the reception quality of the broadcast signal of the first frequency received by the tuner 20.

The electric field level, the FOF value, and the S/N ratio of the broadcast signal of the first frequency are inputted from the tuner 20 into the first evaluating unit 73 as the reception quality information. The first evaluating unit 73 compares the inputted electric field level with a first level threshold value that has been set in advance, compares the inputted FOF value with a first offset range that has been set in advance, and compares the inputted S/N ratio to an S/N threshold value that has been set in advance, to evaluate whether or not the broadcast signal of the first frequency satisfies the first conditions.

In the present embodiment, the first level threshold value is set to 30 dBuV. The first evaluating unit 73 evaluates whether or not the inputted electric field level is at least 30 dBuV.

In the present embodiment, the first offset range is set to a range of between no less than −2 kHz and no greater than +2 kHz. The first evaluating unit 73 evaluates whether or not the inputted FOF is within ±2 kHz.

In the present embodiment, the S/N threshold value is set to 20 dB. The first evaluating unit 73 evaluates whether or not the inputted S/N ratio is at least 20 dB.

If the electric field level is no less than the first level threshold value, the FOF value is within the first offset range, and the S/N ratio is no less than the S/N threshold value, the first evaluating unit 73 evaluates that the broadcast signal of the first frequency is a frequency of a broadcast signal that is broadcasted by a broadcasting station. The first evaluating unit 73 sets the broadcast signal of the first frequency to the frequency received by the tuner 20. That is, the broadcast signal of the first frequency received by the tuner 20 is processed by the HD decoder 30 to generate an audio signal, and the generated audio signal is outputted to the speaker 40.

In the present embodiment, the first conditions are set to the electric field level being no less than the first level threshold value, the FOF value being within the first offset range, and the S/N ratio being less than the S/N threshold value.

When the first evaluating unit 73 evaluates that the electric field level, the FOF value, and the S/N ratio satisfy the first conditions, the first evaluating unit 73 notifies the setting unit 71 that the broadcast signal of the first frequency has satisfied the first conditions. The first conditions correspond to the setting conditions.

Moreover, if the electric field level is less than the first level threshold value or the FOF value is greater than the first offset range, the first evaluating unit 73 notifies the setting unit 71 that the first conditions are not satisfied. Upon inputting the notification from the first evaluating unit 73 indicating that the first conditions are not satisfied, the setting unit 71 sets the first frequency that is to be received next by the tuner 20. The setting unit 71 causes the seek operation to continue by setting a new tuning frequency shifted by the predetermined frequency interval as the first frequency to be tuned by the tuner 20.

The frequency assignments in the digital radio broadcast signals of the hybrid system and the all-digital system will be explained here.

Figure 2:
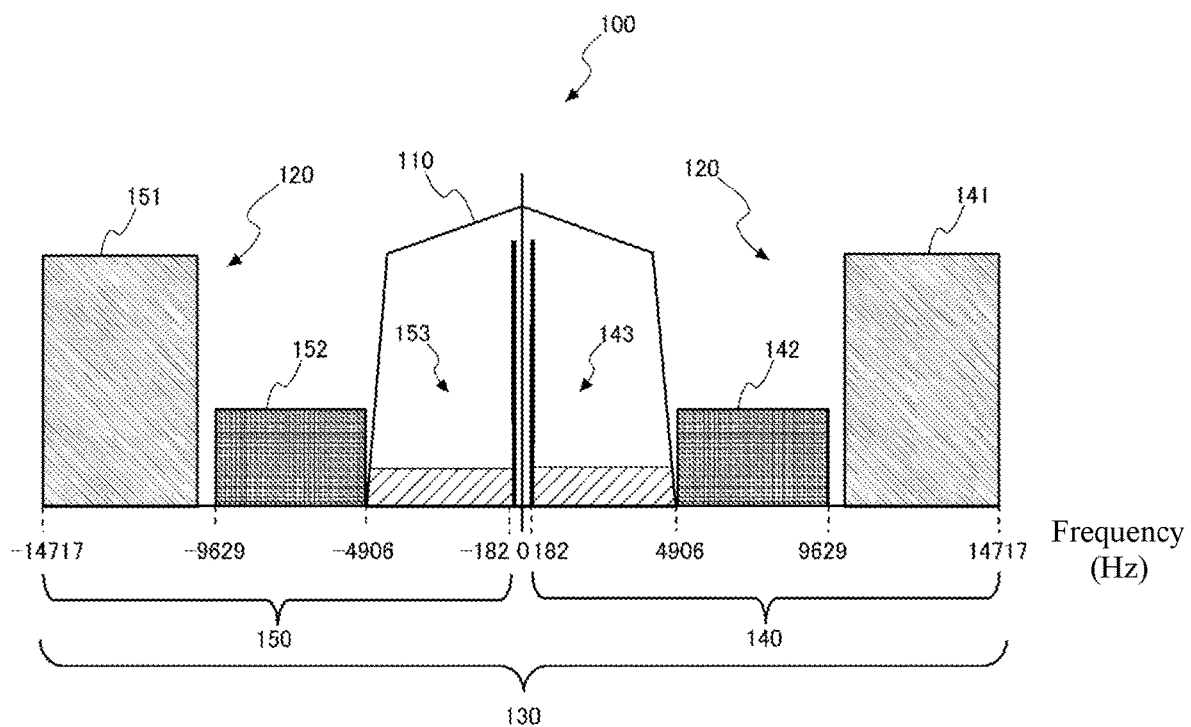
FIG. 2 is a diagram showing the frequency band of a broadcast signal for digital radio of a conventional hybrid system.

FIG. 2 shows the assignments of the frequency bands in the digital radio broadcast signal of the conventional hybrid system. The spectra of the conventional AM modulated analog signal 110 and of the OFDM (Orthogonal Frequency Division Multiplex) subcarrier signal 120 that is a digital broadcast signal, are included within a channel 130 that has a bandwidth of about 30 kHz. This channel 130 is divided into an upper sideband 140 and a lower sideband 150. The upper sideband 140 spreads to about +15 kHz from the central frequency of the channel. The lower sideband 150 spreads to about −15 kHz from the central frequency of the channel.

As illustrated in FIG. 2, the upper sideband 140 is divided into a primary segment 141, a secondary segment 142 and a tertiary segment 143. The lower sideband 150 is divided into a primary segment 151, a secondary segment 152 and a tertiary segment 153. The tertiary segment 143 of the upper sideband 140 and the tertiary segment 153 of the lower sideband 150 are the frequency bands used for the conventional AM modulated analog signal 110. Also, the primary segment 141 and secondary segment 142 of the upper sideband 140, and the primary segment 151 and secondary segment 152 of the lower sideband 150, are assigned to frequency bands for the OFDM subcarrier signal.

Figure 3:
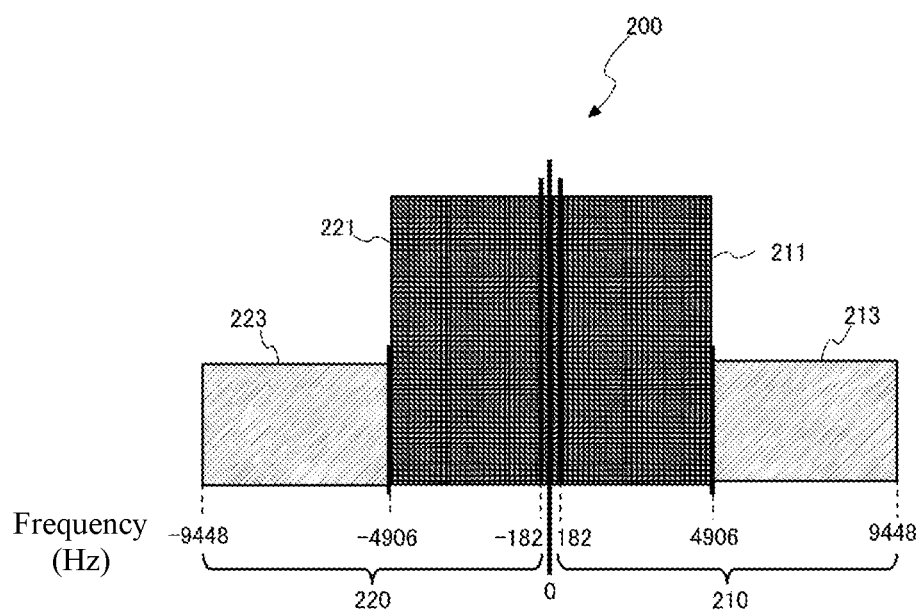
FIG. 3 is a diagram showing schematically subcarrier assignments for AM digital radio of an all-digital format.

FIG. 3 is a schematic view of subcarrier assignments in the AM digital radio of the all-digital format. The broadcast signal 200 of the AM digital radio has an upper sideband 210 and a lower sideband 220. The upper sideband 210 has a subcarrier group 211 known as a primary subcarrier and a subcarrier group 213 known as a secondary subcarrier. The subcarrier group 211 is set to, for example, a frequency range of between 182 Hz and 4096 Hz, and the subcarrier group 213 is set to, for example, a frequency range of between 4906 Hz and 9448 Hz.

Also, the lower sideband 220 has a subcarrier group 221 known as a primary subcarrier and a subcarrier group 223 known as a secondary subcarrier. The subcarrier group 221 is set to, for example, a frequency range of between −182 Hz and 4096 Hz, and the subcarrier group 213 is set to, for example, a frequency range of between −4906 Hz and −9448 Hz.

The setting unit 71 changes the frequency of broadcast signal received by the tuner 20 to the second frequency when it receiving the notification indicating that the broadcast signal of the first frequency satisfies the first conditions from the first evaluating unit 73. This second frequency is set in a range of between 4906 Hz and 9448 Hz, set by the IBOS standard. That is, the second frequency is set to a frequency in the frequency range of the subcarrier group 213 or subcarrier group 223 shown in FIG. 3. In the present embodiment, the second frequency is set to the frequency wherein 8 kHz has been added to or subtracted from the first frequency.

The tuner 20 receives a broadcast signal of the second frequency that is set by the setting unit 71.

The tuner 20 outputs the reception quality information of the received broadcast signal to the controlling unit 50.

The second evaluating unit 75 evaluates the reception quality of the broadcast signal of the second frequency received by the tuner 20. The second evaluating unit 75 inputs the electric field level, the FOF value, and the S/N ratio, as reception quality information, but does not use the S/N ratio in the evaluation here. As described above, the second frequency is set to the frequency of the digital broadcast signal in the frequency range of the subcarrier group 213 or the subcarrier group 223 shown in FIG. 3. Because of this, the second evaluating unit 75 does not evaluate the S/N ratio, which would be used in evaluating the reception quality of an analog signal.

The second evaluating unit 75 evaluates whether or not the broadcast signal of the second frequency satisfies second conditions described below by comparing the inputted electric field level to a predetermined second level threshold value and comparing the inputted FOF value to a predetermined second offset range.

In the present embodiment, the second threshold value is set to 20 dBuV. The second evaluating unit 75 evaluates whether or not the inputted electric field level is at least 20 dBuV. Also, the second offset range is set to the range between −2 kHz and +2 kHz in the present embodiment. The second evaluating unit 75 evaluates whether or not the inputted FOF value is within ±2 kHz.

In the present embodiment, the second conditions are set as the electric field level being no less than the second level threshold value and the FOF value being within the second offset range.

The second frequency is set to a frequency in the frequency range of the subcarrier group 213 or the subcarrier group 223 shown in FIG. 3. Because of this, a value within ±2 kHz is detected as the FOF value of the broadcast signal of the second frequency if it is a broadcast signal of the AM all-digital broadcast. Upon evaluation that the electric field level and the FOF value satisfy the second conditions, the second evaluating unit 75 causes the HD decoder 30 to start the demodulating process on the broadcast signal of the first frequency.

If the second evaluating unit 75 evaluates that the electric field level and/or the FOF value does not satisfy the second conditions, it notifies the setting unit 71 that the second conditions are not satisfied. When the setting unit 71 inputs, from the second evaluating unit 75, the notification that the second conditions are not satisfied, the setting unit 71 sets the tuner 20 to the first frequency that is to be received next.

The HD decoder 30 acquires the data that is included in the broadcast signal through performing a demodulating process on the broadcast signal of the first frequency that was received by the tuner 20 and converted into the intermediate frequency. The HD decoder 30 outputs, to the third evaluating unit 77, the data acquired through the demodulating process.

The third evaluating unit 77 inputs the data from the HD decoder 30. If data indicating an AM all-digital broadcast is included in the data inputted from the HD decoder 30, the third evaluating unit 77 evaluates that the broadcast signal of the first frequency is a broadcast signal received from a broadcasting station of the AM all-digital broadcast.

If, for example, data of an AM hybrid/all-digital dual stream is included in the data inputted from the HD decoder 30, the third evaluating unit 77 evaluates that the broadcast signal of the first frequency is a broadcast signal received from a broadcasting station of an AM all-digital broadcast.

Moreover, if no data indicating an AM all-digital broadcast is included in the data inputted from the HD decoder 30, the third evaluating unit 77 evaluates that the broadcast signal of the first frequency is not a broadcast signal received from a broadcasting station of the AM all-digital broadcast. In this case, the third evaluating unit 77 notifies the setting unit 71 that the broadcast signal of the first frequency is not a broadcast signal of the all-digital format. When the setting unit 71 inputs, from the third evaluating unit 77, notification that the broadcast signal of the first frequency is not a broadcast signal of the all-digital format, the tuner 20 is set to the first frequency that is to be received next.

Figure 4:
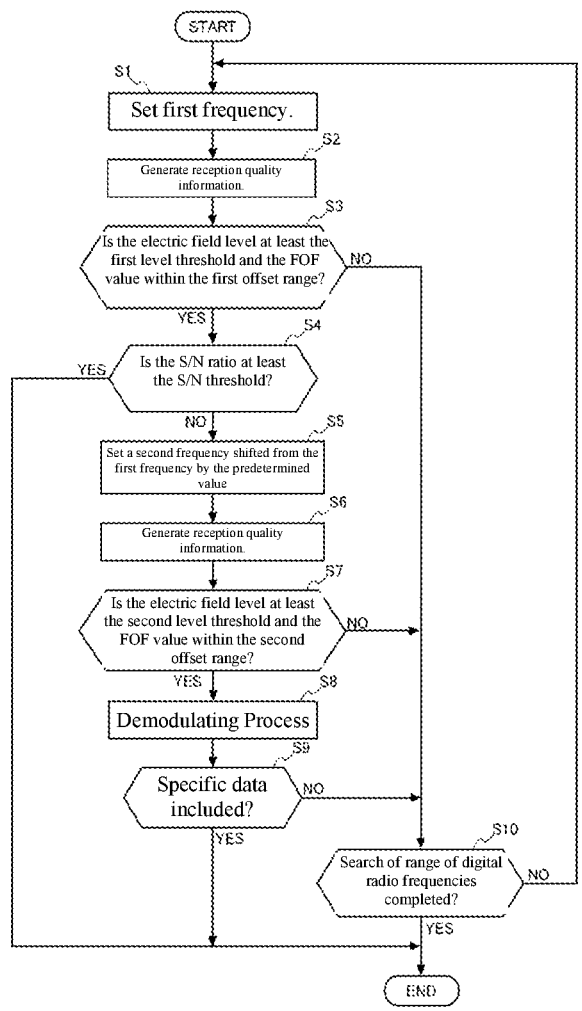
FIG. 4 is a flowchart showing operations of a broadcast signal detecting device.

FIG. 4 is a flowchart showing the operations in the broadcast signal detecting device 1.

The operations of the broadcast signal detecting device 1 will be explained in reference to the flowchart of FIG. 4.

First the controlling unit 50 sets the tuner 20 to the first frequency that is to be received (Step S1). Step S1 corresponds to the receiving step. The controlling unit 50 sets, for the first frequency, a frequency wherein a predetermined value has been added to or subtracted from the frequency at which the broadcast signal is currently being received.

The tuner 20 receives the broadcast signal of the first frequency, set by the controlling unit 50, and generates reception quality information for the broadcast signal of the first frequency that has been received (Step S2). The electric field level, the FOF value, and the SN ratio are included in the reception quality information. The tuner 20 outputs, to the controlling unit 50, the reception quality information that has been generated.

The controlling unit 50 temporarily stores in a memory 60 the reception quality information that has been inputted. Next the controlling unit 50 acquires the electric field level and the FOF value from the memory 60, compares the acquired electric field level to the first level threshold value, and compares the acquired FOF value to the first offset range (Step S3). Step S3 corresponds to the first evaluating step.

If, in the controlling unit 50, the electric field value is less than the first level threshold value, or if the FOF value is a value outside of the first offset range (Step S3/NO), the controlling unit 50 evaluates whether or not the search of the frequency range of the digital radio broadcast has been completed (Step S10). That is, the controlling unit 50 evaluates whether or not the next first frequency to be received by the tuner 20 is a frequency that is outside of the range of the frequency band of the digital radio broadcast of the AM all-digital system (Step S10). If the first frequency to be received next by the tuner 20 is a frequency that is outside of the range of the frequency band of the digital radio broadcast of the AM all-digital system (Step S10/YES), the controlling unit 50 terminates the process flow. Moreover, if the first frequency to be received next by the tuner 20 is a frequency that is within the range of the frequency band of the digital radio broadcast of the AM all-digital system (Step S10/NO), the controlling unit 50 returns to Step S1 and sets the first frequency.

Moreover, if the electric field level is no less than the first level threshold value and the FOF value is within the first offset range (Step S3/YES), the controlling unit 50 acquires the S/N ratio from the memory 60, and compares the acquired S/N ratio to the S/N threshold value (Step S4).

If the acquired S/N ratio is no less than the S/N threshold value (Step S4/YES), the controlling unit 50 evaluates that the broadcast signal of the first frequency is a broadcast frequency of a broadcasting station. The controlling unit 50 sets the frequency received by the tuner 20 to the first frequency that was set in Step S1, and commences reception of the broadcast signal.

Moreover, if the acquired S/N ratio is less than the S/N threshold value (Step S4/NO), the controlling unit 50 sets a second frequency as the frequency to be received by the tuner 20, wherein the second frequency is a frequency where the predetermined 8 kHz is added to the first frequency (Step S5). While in this process flow the explanation is for a case wherein a frequency wherein 8 kHz is added to the first frequency is set for the second frequency, instead a frequency wherein 8 kHz is subtracted from the first frequency may be set for the second frequency. Step S5 corresponds to the changing step. The tuner 20 receives a broadcast signal of the second frequency that was set by the controlling unit 50, and generates reception quality information of the received broadcast signal of the second frequency (Step S6). The tuner 20 outputs, to the controlling unit 50, the reception quality information that has been generated. Step S6 corresponds to the converting step.

The controlling unit 50 temporarily stores in a memory 60 the reception quality information that has been inputted. Next the controlling unit 50 acquires the electric field level and FOF value from the memory 60, compares the acquired electric field level to the second level threshold value, and compares the acquired FOF value to the second offset range (Step S7). Step S7 corresponds to the second evaluating step.

If the electric field level is less than the second level threshold value, or the FOF value is outside of the second offset range (Step S7/NO), the controlling unit 50 jumps to the evaluation in Step S10, to evaluate whether or not the search of the frequency range of digital radio broadcasting has been completed (Step S10).

Moreover, if the electric field level is no less than the second level threshold value and the FOF value is within the second offset range (Step S7/NO), the controlling unit 50 causes the HD decoder 30 to perform the demodulating process on the first frequency, to determine the frequency of the broadcast signal.

The HD decoder 30 performs the demodulating process on the broadcast signal received and converted into the intermediate frequency by the tuner 20 (Step S8), to acquire the data included in the broadcast signal. Step S8 corresponds to the acquiring step. The HD decoder 30 outputs the acquired data to the controlling unit 50. The controlling unit 50 evaluates whether or not prescribed data is included in the data that is inputted from the HD decoder 30 (Step S9).

Step S9 corresponds to the third evaluating step.

If any data of an AM hybrid/all-digital dual stream is included in the inputted data (Step S9/YES), the controlling unit 50 evaluates that the broadcast signal is of the all-digital format. The controlling unit 50 sets the frequency received by the tuner 20 to the first frequency that was set in Step S1, and commences reception of the broadcast signal.

Also, if any AM hybrid/all-digital dual-stream data is not included in the inputted data (Step S9/NO), the controlling unit 50 evaluates that the broadcast signal is not of the all-digital system. In this case, the controlling unit 50 jumps to the evaluation in Step S10, to evaluate whether or not the search of the frequency range of digital radio broadcasting has been completed (Step S10). If the first frequency to be received next by the tuner 20 is a frequency that is within the range of the frequency band of the digital radio broadcast of the AM all-digital system (Step S10/NO), the controlling unit 50 returns to Step S1 and sets the first frequency.

As explained above, the broadcast signal detecting device 1 according to the present embodiment is a device for detecting a receivable radio broadcast signal.

The broadcast detecting signal device 1 comprises a tuner 20, an HD decoder 30 and a controlling unit 50.

The tuner 20 receives a broadcast signal of a first frequency that has been set by the controlling unit 50.

The HD decoder 30 performs a demodulating process on data included in the broadcast signal.

The controlling unit 50 comprises a setting unit 71, a first evaluating unit 73, a second evaluating unit 75 and a third evaluating unit 77.

The first evaluating unit 73 evaluates whether or not the reception quality of the broadcast signal of the first frequency, received by the tuner 20, satisfies the first conditions.

If the first evaluating unit 73 evaluates that the reception quality of the broadcast signal of the first frequency satisfies the first conditions, the setting unit 71 sets, as the frequency to be received by the tuner 20, a second frequency within predetermined range from the first frequency.

The second evaluating unit 75 acquires the frequency offset of the broadcast signal of the second frequency that has been received by the tuner 20 and converted into a signal of the intermediate frequency. The second evaluating unit 75 evaluates whether or not the acquired frequency offset is within the range that has been set in advance.

If the frequency offset is within the predetermined range, the HD decoder 30 performs a demodulating process on the broadcast signal of the first frequency, to acquire the data that is included in the broadcast signal of the first frequency.

The third evaluating unit 77 evaluates whether or not data that has been set in advance is included in the acquired data, to evaluate whether or not the broadcast signal of the second frequency is a broadcast signal of a broadcasting station.

In the case of an all-digital system, there will also be a digital signal band at the second frequency within the predetermined range from the first frequency, and the value within the predetermined range is outputted as the frequency offset. If the frequency offset of the broadcast signal at the second frequency is within the predetermined range, the demodulating process can be performed on the broadcast signal of the first frequency, to limit the frequencies for executing the demodulating process, making it possible to reduce the time required for searching for a broadcast signal of an all-digital system.

Also, the second evaluating unit 75 evaluates whether or not the electric field level of the broadcast signal of the second frequency is at least the predetermined threshold value, and if the electric field level of the broadcast signal of the second frequency is at least the predetermined threshold value, executes the acquiring step.

Consequently, the demodulating process can be performed only on broadcast signals of frequencies with high probabilities of being broadcast frequencies of broadcasting stations, making it possible to further shorten the time required for searching for a broadcast signal of the all-digital system.

If the frequency offset is in a range of between −2 kHz and 2 kHz, the second evaluating unit 75 causes the HD decoder 30 to carry out the demodulating process.

Consequently, the demodulating process can be performed only on broadcast signals of frequencies with high probabilities of being broadcast frequencies of the all-digital system, making it possible to further shorten the time required for searching for broadcast signals of the all-digital system.

If the electric field level of the broadcast signal is no less than 20 dBuV and the frequency offset is in a range of between −2 kHz and 2 kHz, the second evaluating unit 75 causes the HD decoder 30 to carry out the demodulating process.

Consequently, the demodulating process can be performed only on broadcast signals of the frequencies with high probabilities of being broadcast frequencies of the all-digital system, making it possible to further shorten the time required for searching for broadcast signals of the all-digital system.

The setting conditions are that the electric field level of the broadcast signal is no less than 30 dBuV, the frequency offset is in a range of between −2 kHz and 2 kHz, and the S/N ratio is less than 20 dB.

Consequently, the demodulating process can be performed only on broadcast signals of frequencies with high probabilities of being a broadcast frequencies of the all-digital system, making it possible to further shorten the time required for searching for broadcast signals of the all-digital system.

The second frequency is set in a range of between 4906 Hz and 9448 Hz.

The second frequency is a frequency shifted from the first frequency by 8 kHz.

Consequently, the second frequency can be set within the AM digital radio broadcast signal subcarrier frequency band.

The embodiment set forth above is no more than an illustration of one aspect of the present invention, and the present invention may be modified and applied appropriately in a range that does not deviate from the spirit and intent thereof.

Moreover, in case that the broadcast signal detecting method of the present invention is achieved using a computer, the present invention may also be structured in the form of the program to be executed in the computer, or the recording medium whereon the program is recorded, or the transmitting medium for transmitting the program.

Additionally, for ease in understanding the processes in the controlling unit 50, the processing units of the flowchart shown in FIG. 4 are divided depending on the main processing details thereof, and the present invention is not limited by the method by which the processing units are divided or the names thereof. The processes of the controlling unit 50 may be divided into a greater number of processes, depending on the details of the processes. Moreover, the processes of the controlling unit 50 may be divided so that a single processing part may include more processes.

EXPLANATION OF REFERENCE SYMBOLS

1: Broadcast Signal Detecting Device
10: Antenna

20: Tuner
30: HD Detector
40: Speaker
50: Controlling Unit
60: Memory
61: Control Program
70: Processor
71: Setting Unit
73: First Evaluating Unit
75: Second Evaluating Unit
77: Third Evaluating Unit
100: Parking Assist Device
110: AM Analog Signal
120: Digital Radio Broadcast Signal
130: Upper Sideband Frequency Region
132: Lower Sideband Frequency Region
141: First Segment
142: Second Segment
143: Third Segment
151: First Segment
152: Second Segment
153: Third Segment
200: Broadcast Signal
210: Upper Sideband Region
211: Subcarrier Group
213: Subcarrier Group
220: Lower Sideband Region
221: Subcarrier Group
223: Subcarrier Group

The invention claimed is:

1. A broadcast signal detecting method for detecting a broadcast signal of a radio broadcast of an all-digital system, including:
a receiving step for receiving a broadcast signal of a first frequency;
a first evaluating step for evaluating whether or not reception quality of the broadcast signal of the first frequency, received through the receiving step, satisfies setting conditions;
a changing step for changing the frequency to be received by the receiving step to a second frequency that is within a predetermined range from the first frequency if it is evaluated in the first evaluating step that the reception quality of the broadcast signal of the first frequency satisfies the setting conditions;
a converting step for converting the broadcast signal of the second frequency received in the receiving step to a signal of an intermediate frequency;
a second evaluating step for evaluating whether or not a frequency offset is within a predetermined range, the frequency offset is the amount of offset between a reference frequency and the frequency of the converted signal of the intermediate frequency;
an acquiring step for performing a demodulating process on the broadcast signal of the first frequency and acquiring data included in the broadcast signal of the first frequency, if it is evaluated in the second evaluating step that the frequency offset is within the predetermined range; and
a third evaluating step for evaluating whether or not the broadcast signal of the first frequency is a broadcast signal of a broadcasting station by evaluating whether or not predetermined data is included in the acquired data.

2. The digital signal detecting method according to claim 1, wherein:
the second evaluating step further evaluates whether or not the electric field level of the broadcast signal of the second frequency is at least a predetermined threshold value, and executes the acquiring step if the electric field level of the broadcast signal of the second frequency is at least the predetermined threshold value.

3. The broadcast signal detecting method according to claim 1, wherein:
the second evaluating step causes the demodulating process to be performed in the acquiring step if the frequency offset is within a range of between −2 kHz and 2 kHz.

4. The broadcast signal detecting method according to claim 2, wherein:
the second evaluating step causes the demodulating process to be performed in the acquiring step if the electric field level of the broadcast signal is no less than 20 dBuV and the frequency offset is within a range of between −2 kHz and 2 kHz.

5. The broadcast signal detecting method according to claim 1, wherein:
the setting conditions are that the electric field level of the broadcast signal is no less than 30 dBuV, the frequency offset is within a range of between −2 kHz and 2 kHz, and the S/N ratio is less than 20 dB.

6. The broadcast signal detecting method according to claim 1, wherein:
the second frequency is set in a range of between 4906 Hz and 9448 Hz.

7. The broadcast signal detecting method according to claim 1, wherein:
the second frequency is a frequency wherein 8 kHz is added to the first frequency.

8. A broadcast signal detecting device for detecting a broadcast signal of a radio broadcast of an all-digital system, including:
a receiving unit for receiving a broadcast signal of a first frequency;
a first evaluating unit for evaluating whether or not reception quality of the broadcast signal of the first frequency, received through the receiving unit, satisfies setting conditions;
a changing unit for changing the frequency to be received by the receiving unit to a second frequency that is within a predetermined range from the first frequency if it is evaluated in the first evaluating unit that the reception quality of the broadcast signal of the first frequency satisfies the setting conditions;
a second evaluating unit for evaluating whether or not a frequency offset is within a predetermined range, the frequency offset is the amount of offset between a reference frequency and the frequency of the signal which is a converted the broadcast signal of the second frequency received by the receiving unit into an intermediate frequency;
an acquiring unit for performing a demodulating process on the broadcast signal of the first frequency and acquiring data included in the broadcast signal of the first frequency, if it is evaluated in the second evaluating unit that the frequency offset is within the predetermined; and
a third evaluating unit for evaluating whether or not the broadcast signal of the first frequency is a broadcast signal of a broadcasting station by evaluating whether or not predetermined data is included in the data acquired by the acquiring unit.

* * * * *